United States Patent [19]

Barclay

[11] Patent Number: 4,840,316

[45] Date of Patent: Jun. 20, 1989

[54] RUBBER CRUMB RECOVERY FROM VEHICLE TIRES

[76] Inventor: Randel L. Barclay, 5616 Carpenter Rd., Stockton, Calif. 95205

[21] Appl. No.: 218,687

[22] Filed: Jul. 13, 1988

[51] Int. Cl.⁴ .............................................. B02C 18/22
[52] U.S. Cl. .............................. 241/279; 241/DIG. 31
[58] Field of Search ............ 241/279, DIG. 31, 285 B, 241/101.4; 157/13; 29/79; 83/846, 853; 407/52, 60, 43

[56] References Cited

U.S. PATENT DOCUMENTS

| | | | |
|---|---|---|---|
| 1,498,935 | 6/1924 | Shull | |
| 1,751,258 | 3/1930 | Vogl | 241/279 X |
| 3,658,267 | 4/1972 | Burwell | 241/301 |
| 3,693,894 | 9/1972 | Willette | 241/279 |
| 3,721,392 | 3/1973 | Burwell | 241/301 |
| 3,879,825 | 4/1975 | Jensen et al. | 29/79 |
| 4,235,383 | 11/1980 | Clark | 241/38 |

FOREIGN PATENT DOCUMENTS 479658 11/1975 U.S.S.R. ...................... 241/DIG. 31

Primary Examiner—Mark Rosenbaum
Attorney, Agent, or Firm—Thomas Schneck

[57] ABSTRACT

An apparatus for removing the rubber from the crown portion of a tire having a rotatably driven rasp and a linearly displaceable capture roller. The capture roller is moved from a load position distant the rasp to an engagement position closely adjacent the rasp. First and second tensioning rollers are biased to pinch a tire between each of the tensioning rollers and the capture roller. In forcing a captive tire into the area between the tensioning rollers, the capture roller presents to the rasp a work surface which is highly stressed. Traction-enhancement rollers further deform the tire by increasing the wrap angle around each of the tensioning rollers.

20 Claims, 6 Drawing Sheets

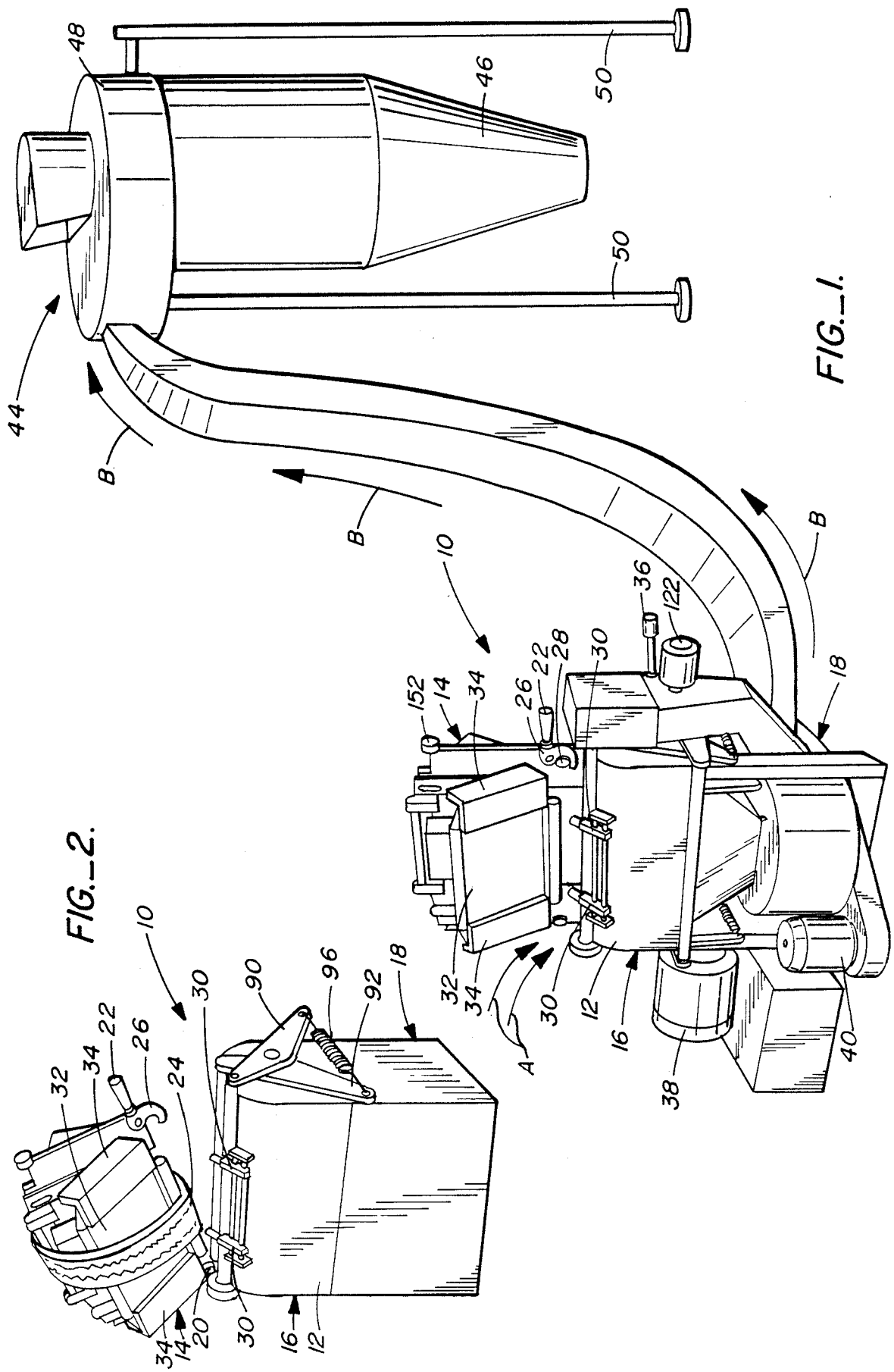

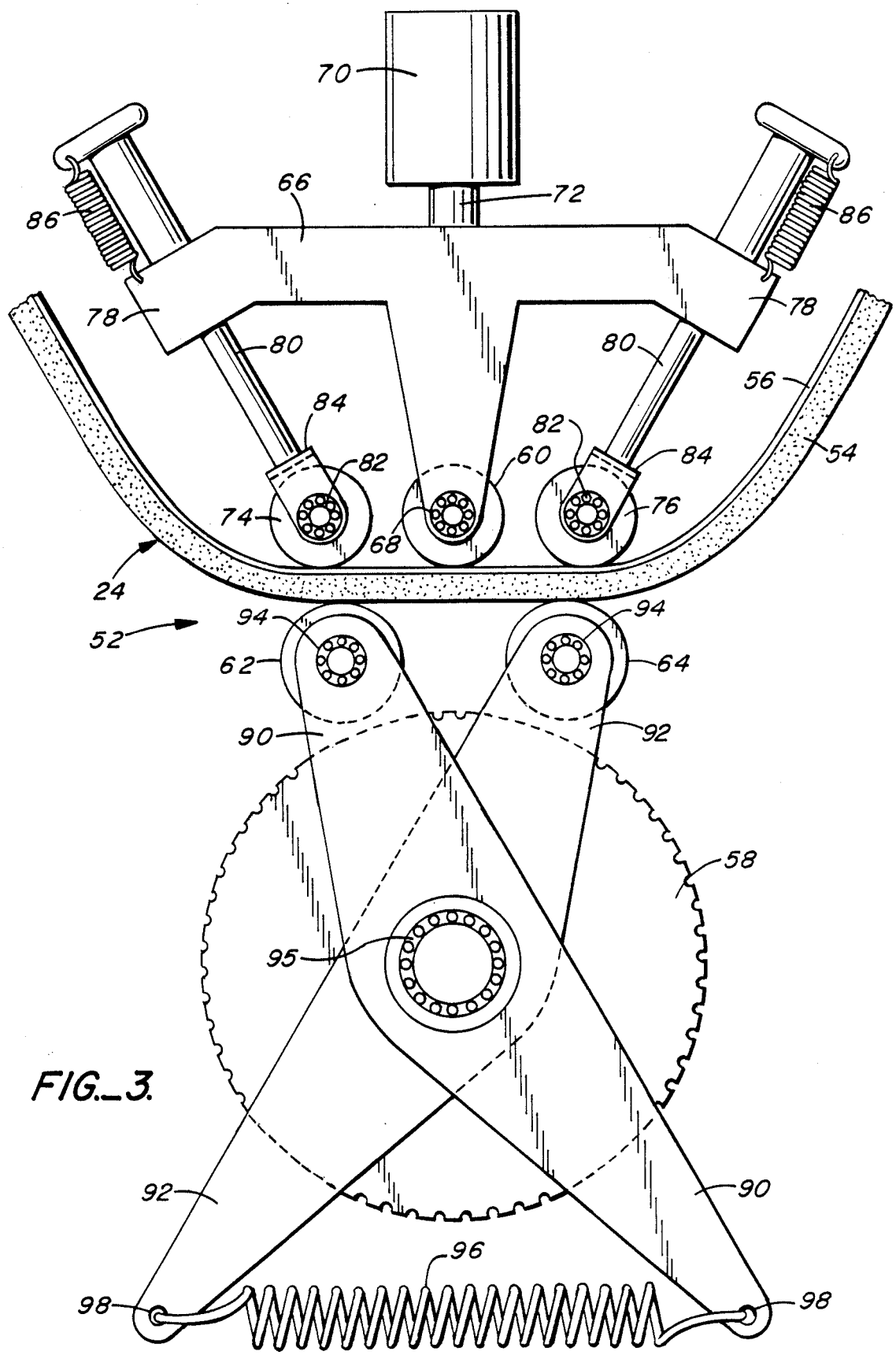
FIG._3.

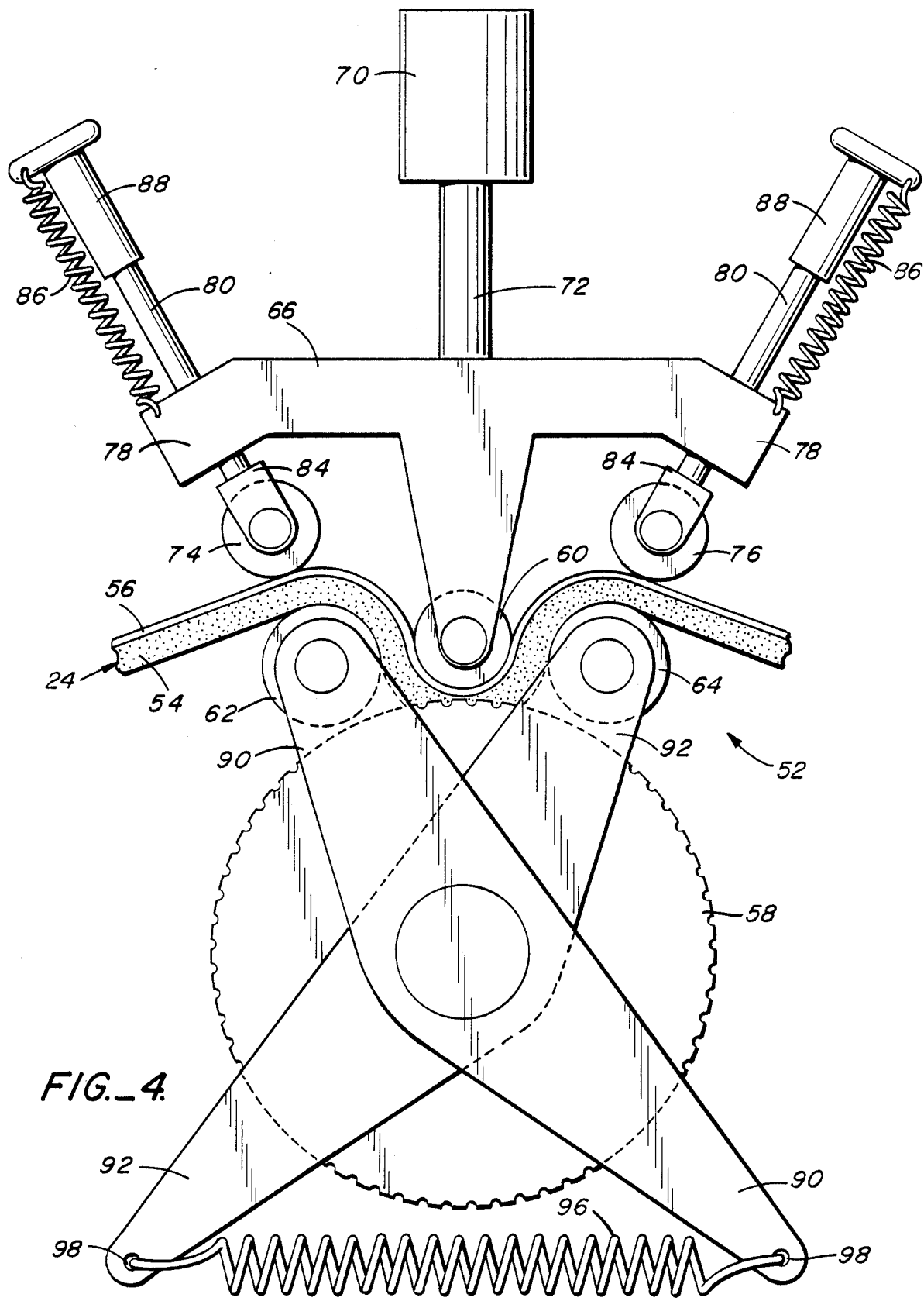
FIG._4.

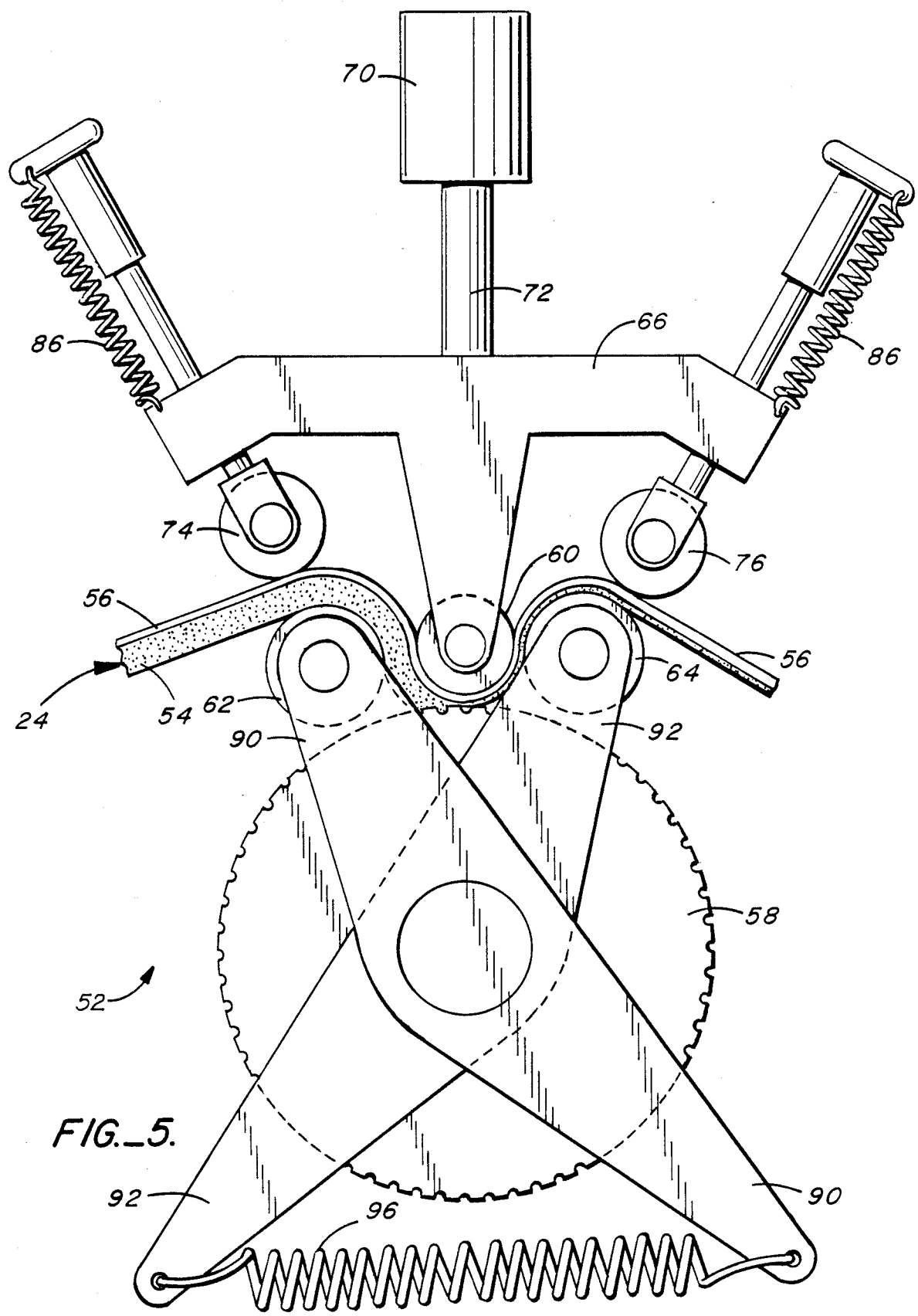
FIG._5.

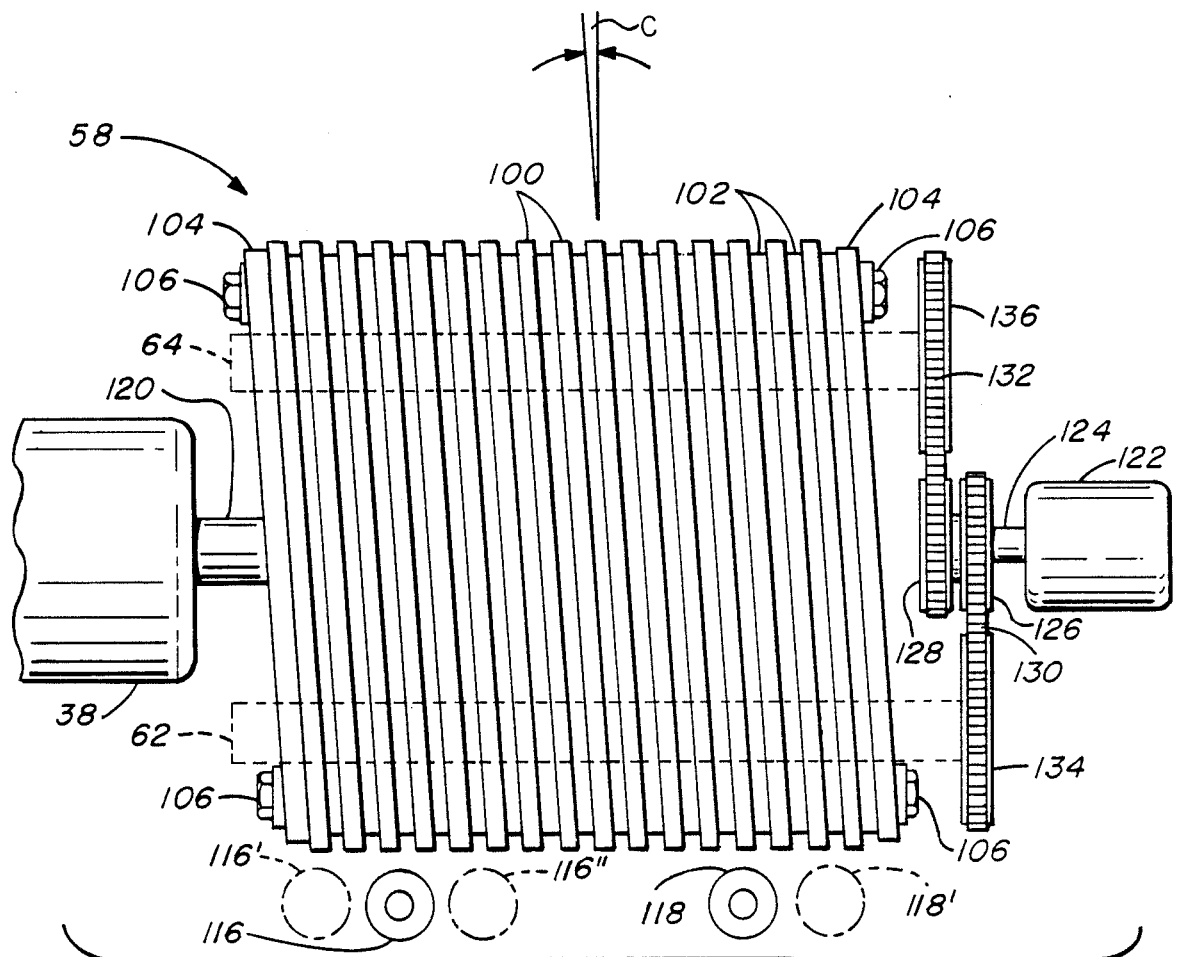
FIG._6.
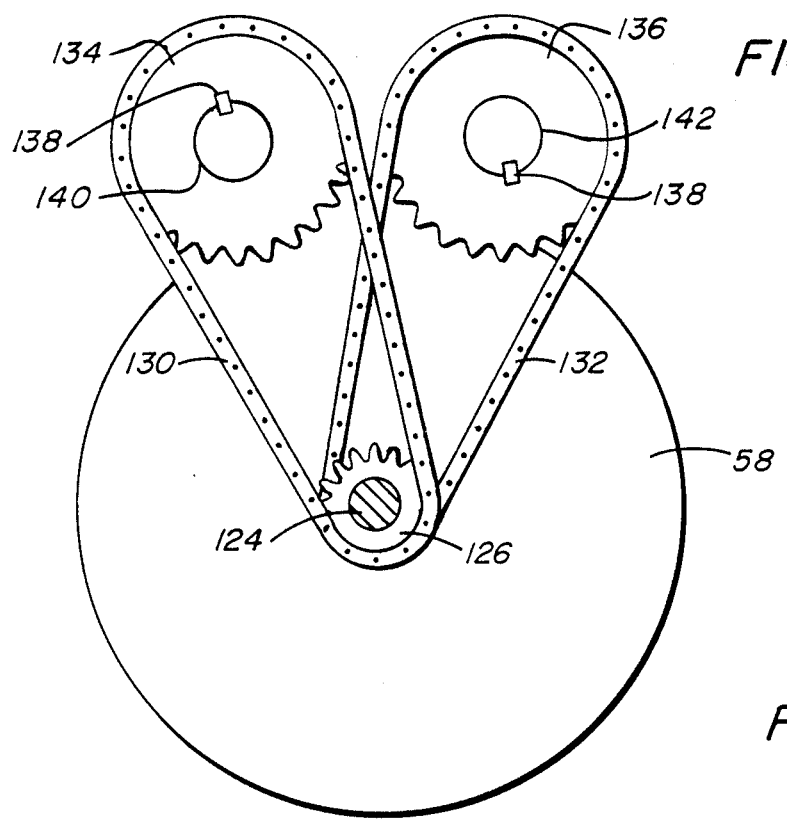
FIG._8.

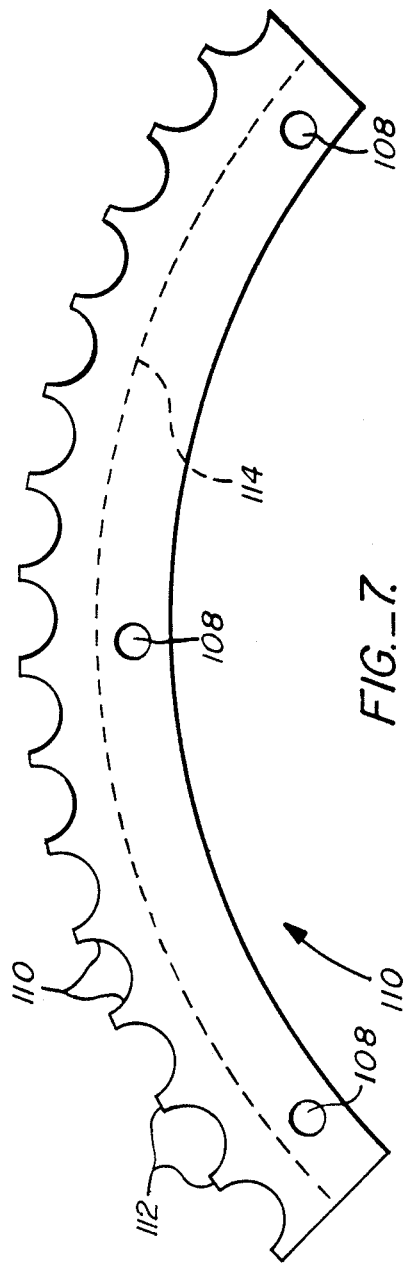
FIG._7.
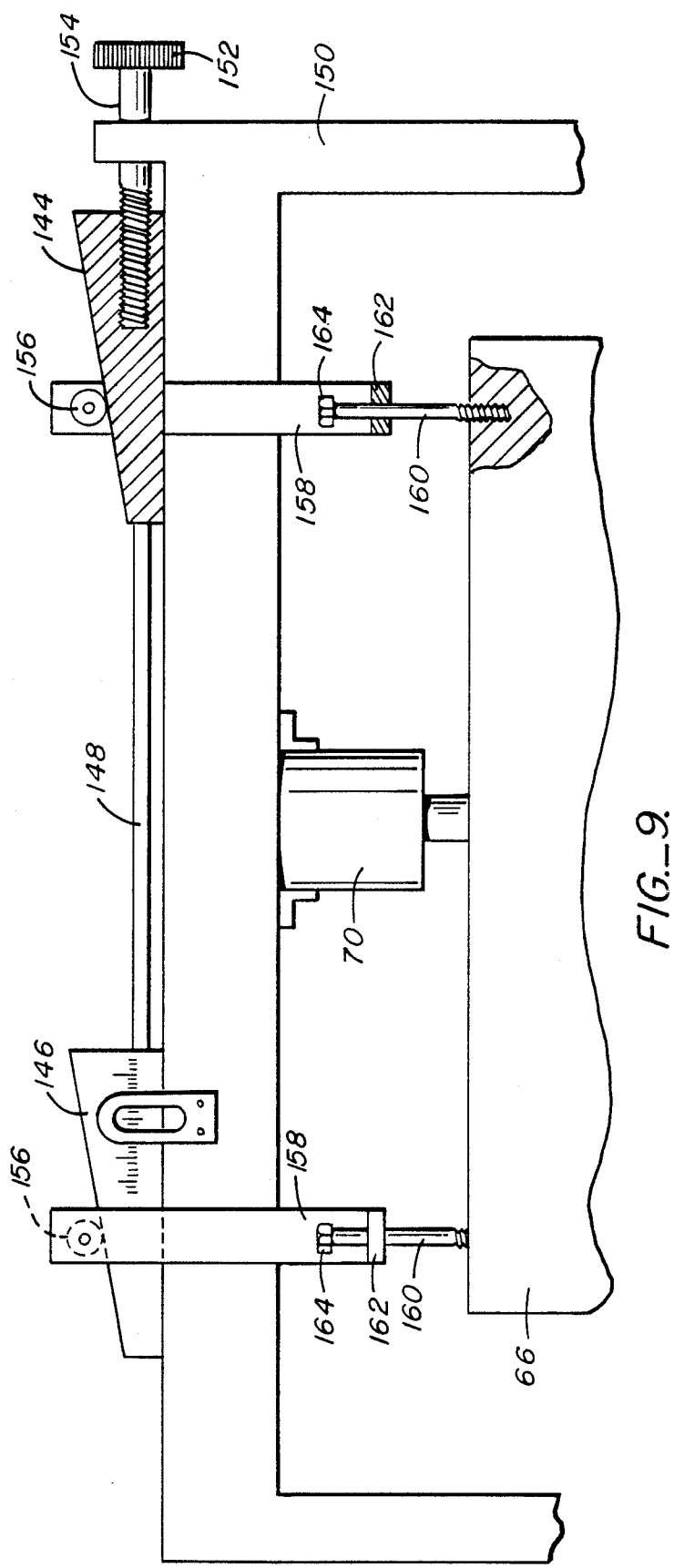
FIG._9.

RUBBER CRUMB RECOVERY FROM VEHICLE TIRES

TECHNICAL FIELD

The present invention relates generally to apparatus for rubber recovery from discarded tires and more particularly to apparatus for removing and recovering rubber crumbs from the tread portion of a tire carcass.

BACKGROUND ART

The problems involved with disposal of discarded automobile tires are receiving increasing attention. Burial of tires within land fills is usually refused because of the unwillingness of tires to remain buried. Because of the size and the flexibility of tires, often a tire buried under five feet of dirt is back at the surface within a decade. For the most part, tires do not rise in elevation but, rather, soil particles fall into cracks and crevasses caused by previous soil settlement. The size of a tire prevents corresponding descent by the tire. Moreover, the resiliency of the tire results in the return of the tire to its normal shape, a process which creates the cracks and crevasses for enhanced settlement of the dirt which surrounds the tire. Thus, increasingly tires are stored in dumps which are fire hazards and breeding grounds for mosquitoes and other insects that flourish within small pockets of trapped water.

Not all used tires are discarded. Tires can be burned to generate electricity. The heat of burning tires is used to drive turbines for the generation of electricity. Nevertheless, the burning of tires for electricity is uncommon, since the profit margin is small.

Material recycling is the answer to the problem of tire disposal. Material recycling, however, raises its own problems. Tires are made of a number of materials and these materials must be separated before recycling can take place. For example, metal bead wires are inserted at the inner diameter of each of a tire's side walls. These bead wires provide the necessary resiliency and support the tire on the wheel of a vehicle. Moreover, the tire is belted, having a material less resilient than rubber along the inner circumference of the tire crown portion. This belting may be metallic, such as steel, or may be fiber.

At one time the rubber salvaged from a used tire was used in making new tires. But the long molecules that give rubber its strength are broken during partial liquefaction in the remolding process, and the resulting tire is unsuitable for the present rugged radial tires. The recycled rubber is used, however, for such purposes as asphalt road resurfacing, and making patches, rubber lining, mats and non-pneumatic wheels. A number of industrial uses also exist. U.S. Pat. Nos. 3,721,392 and 3,658,267 to Burwell teach devices for abrasively removing the rubber from a tire. An endless grinding belt or sander is brought into contact with the tire to provide a pulverized or powdered rubber. However, the properties of the tire material subject the grinding belt or sander to premature wear.

U.S. Pat. Nos. 3,693,894 to Willette and 1,498,935 to Shull teach cutting members, rather than abrasive removal of the rubber. The shape of the tire as it contacts the cutting member in the Willette tire shredder is dictated by the tire itself. Shull, on the other hand, teaches stretching of the tire prior to contact with a cutting member. As a consequence, only a curved portion of the tire is brought into contact with the cutting member, as is to be expected in stripping a curved surface.

It is an object of the present invention to provide an apparatus which recovers rubber from a discarded tire in a useful form and in an efficient manner.

DISCLOSURE OF THE INVENTION

The above objects have been met by a tire tread crumbing apparatus which presents the tread or crown portion of a tire to cutting blades in a flattened yet highly stressed condition. The flattening of the tread portion provides a greater work surface area for rotary cutting blades, while the highly stressed condition at this area is critical to cutting materials having the properties of rubber. The present invention overcomes the normal tradeoff between work surface area and tire tensioning.

The present invention includes a rotating drum with blades having a circumferential surface adapted to remove the rubber from the crown portion of tire tread. Such a drum is commonly referred to as a rotary rasp. It has been discovered that it is highly preferred to cut into the tire rather than sanding away the tread, but a grinding surface will not reduce either the tire tensioning or increased work surface provided by the present invention. First and second tensioning rollers are pivotally mounted in closely spaced relation to the circumference of the rasp. Each tensioning roller is rotatably fixed to a first end of a lever arm and each lever arm has a pivot point at the rotational axis of the rasp. The ends of the lever arms opposite the tensioning rollers are biased together but permit mutually independent pivoting of the tensioning rollers about the circumference of the rasp.

A capture roller is mounted for linear movement relative to the drum and has an engagement position closely spaced to the circumference between the first and second tensioning roller. The capture roller also has a load position removed from the engagement position for placement of the crown portion of a tire between the capture roller and the first and second tensioning rollers. Displacement of the capture roller into an engagement position then forces the tensioning rollers to radially separate as the crown portion is brought into contact with the rasp. The wrap of the captive tire around the capture roller and the tensioning roller maintains the tire in a highly stressed condition, but provides a flatter, and therefore wider, work surface than if the tire were wrapped solely around the capture roller.

The rasp is rotated at a high rate of speed, while the tensioning rollers are rotated relatively slowly in the opposite direction to move the tire past the rasp. The distance of the capture roller to the rasp is a gauged distance so that the rubber is moved but the metallic or fabric belting of the tire does not contact the rasp. Traction-enhancement rollers are mounted for corresponding movement with the capture roller so that the traction-tensioning rollers are biased for contact with the tensioning rollers. The traction-enhancement rollers increase the stress upon the tire and, like the tensioning rollers, are spring biased. The spring biasing of the rollers maintains a constant tension despite variation in thickness. Thus, an advantage of the present invention is that a constant tension is provided despite variation in thickness. Variations in thickness may be a result of uneven tire wear, use of the rasp to strip different size tires, and the left-to-right variation resulting from stripping a tire using a lengthwise process.

Another advantage of the present invention is that the five rollers are symmetrically arranged, permitting operation of the apparatus in either a forward or rearward direction. Preferably, the rasp is of the cutting type and includes blades such as those described in U.S. Pat. No. 3,879,825 to Jensen et al. These blades are of the expendable type since the blades are highly susceptible to wear. The reversibility of the present invention substantially increases the wear life of the blades.

BRIEF DESCRIPTION OF THE DRAWINGS

FIG. 1 is a perspective view of a tire crumbing apparatus in accord with the present invention.

FIG. 2 is a partial perspective view of the apparatus of FIG. 1 shown in a load position.

FIG. 3 is a schematic front view of the tire stressing assembly of FIG. 2 in a load position.

FIG. 4 is a schematic front view of the tire stressing assembly of FIG. 3 in an engagement position.

FIG. 5 is a front schematic view of the tire stressing assembly of FIG. 4 in a running condition.

FIG. 6 is a top plane view of the rasp of FIG. 1.

FIG. 7 is a front view of a cutter blade of FIG. 6.

FIG. 8 is a schematic front view of the chain drive arrangement of FIG. 6.

FIG. 9 is a schematic side view of the gauging assembly of FIG. 1.

BEST MODE FOR CARRYING OUT THE INVENTION

With reference to FIGS. 1 and 2, a recycling apparatus 10 for removing rubber from the tread or crown portion of a tire is shown. The apparatus includes an enclosure housing 12 for dust control and has a hinged upper portion 14, a rasp section 16, and a lower vacuum section 18.

The upper portion 14 is fixed to the rasp section 16 at a hinge 20. A lock handle 22 facilitates manipulation of the hinged upper portion 14 between the closed position shown in FIG. 1 and the open position of FIG. 2. In the open position a tire 24 may be wrapped around the hinged upper portion. As shown in FIG. 1, the lock handle 22 is part of a hook lock 26 which receives a projection 28 to secure the hinged upper portion in the closed position. Once locked down, the tire 24 is maintained in the center of the apparatus by guides 30 associated with the rasp section 16 and by a planar recessed area and raised regions 34 on each side of the hinged upper portion.

As will be explained more fully below, even after the hinged upper portion 14 has been secured with tire 24 in the closed position, the tire is not in a condition for removal of rubber. A control lever 36, shown in FIG. 1, governs operation of a hydraulic assembly for moving the tire into an engagement position. In the engagement position, the tire contacts a rasp, not shown, rotated by a drive motor 38. The rotatably driven rasp cuts away rubber particles from the tire 24. These particles are drawn into the vacuum section 18 of the apparatus by a blower motor 40. The blower motor draws air into the apparatus at the junction of the hinged upper portion 14 and the rasp section 16, as shown by arrows A. The combination of air and rubber particles is then conducted through a duct 42, shown by arrows B, to a cyclone separator 44. The cyclone separator is of the type known in the art, using a centrifugal process to separate particles from air. The chute 46 is held above the ground by legs 50.

FIG. 3 shows the tire stressing assembly 52 in a load position. In stripping tire rubber 54 from tire belting 56 by means of a rasp 58 having cutting blades, it is important to tension the tire before contact with the rasp. For example, it would be possible to wrap a tire around a arcuate surface. Typically, there is a tradeoff between maximizing tensioning and maximizing the area of tire brought into contact with the rasp. The tire stressing assembly 52, however, maintains a tire 24 in a highly stressed condition while providing substantial contact area between the rasp and the tire.

The tire stressing assembly 52 includes a capture roller 60 and first and second tensioning rollers 62 and 64. The capture roller 60 is mounted to a yoke 66 by a ball bearing assembly 68. The capture roller may be moved linearly toward the rasp 58 by a hydraulic ram 70 attached to the yoke 66 by shaft 72. The tire stressing assembly 52 is shown in a load position in FIG. 3, with the capture roller 60 and the tensioning rollers 62 and 64 only tangentially contacting the tire 24.

Also contacting the belting 56 of the tire 24 are a pair of traction-enhancement rollers 74 and 76. These rollers are mounted to angulate segments 78 of the yoke 66. Apertures through the angulate segments 78 receive shafts 80. The traction-enhancement rollers 74 and 76 are each attached to a ball bearing assembly 82 of a bracket 84 which, in turn, is fixed to the associated shaft 80.

The traction-enhancement rollers 74 and 76 are capable of two directions of travel. Firstly, the hydraulic ram 70 provides parallel motion of the rollers 74 and 76 until the three rollers 60, 74 and 76 associated with the yoke 66 contact the tire 24. Beyond this point, further extension of the shaft 72 from the hydraulic ram 70 causes deformation of the tire 24, as shown in FIG. 4. However, while the capture roller 60 deforms the tire, the shafts 80 are slidably received within the yoke to allow a second direction of motion by the traction-enhancement rollers 74 and 76. The traction-enhancement rollers 74 and 76 combine with the tensioning rollers 62 and 64 to further deform the tire. The shafts 80 associated with the traction-enhancement rollers are preferably at a 30° angle relative to extension of the hydraulic ram shaft 72. Springs 86 bias the traction-enhancement rollers in the direction of the associated tensioning roller. A first end of each spring 86 is attached to an angulate segment 78 of the yoke and the opposite end is fixed to an enlarged cap 88 of the shaft 80. The enlarged caps 88 determine the first extreme positions of the traction-enhancement rollers 74 and 76, as shown in FIG. 3. The second extreme positions are determined by contact of the brackets 84 with the yoke 66, but in operation of the tire stressing assembly 52 these second extreme positions will not be reached.

Referring now to FIGS. 3 and 4, the first and second tensioning rollers 62 and 64 are each mounted to a lever arm 90 and 92 at a bearing assembly 94. The pivot points of the lever arms 90 and 92 coincide with the rotational axis of the rasp bearing assembly 95. At the ends of the lever arms distal the tensioning rollers 62 and 64, the opposed ends of a helical spring 96 are advanced through apertures 98 to bias the tensioning rollers toward one another.

In moving from the load position shown in FIG. 3 to the engagement position of FIG. 4, the capture roller 60 causes the first tensioning roller 62 to rotate in a counterclockwise direction about the rasp 58. Likewise, the second tensioning roller 64 pivots, but in a clockwise direction. The counterrotation of the tensioning rollers causes extension of the helical spring 96. The force of the helical spring tensions the tire 24 against the capture roller 60. As a result, the captive tire 24 is in a highly stressed condition, but the resulting deformation of the tire provides a larger work surface for the rasp than previously attained.

The diameter of the rasp 58 is 14.5 inches. The rasp rotates at approximately 900 revolutions per minute. The capture roller 60 has a diameter of 3.75 inches. Preferably, the ratio of the diameter of the rasp to the diameter of the capture roller is 1:4. As will be described more fully below, the tensioning rollers 62 and 64 are driven to move captive tires past the rasp 58. The tensioning rollers rotate in the direction opposite to that of the rasp and at an angular velocity of between 0 and 30 feet per minute. The diameter of each tensioning roller 62 and 64 is four inches. In moving the capture roller 60 toward the rasp, displacement of the capture roller should have a limit which prevents contact of the rasp with the belting 56 of the captive tire. Typically the belting is metallic and contact would cause premature wear of the rasp. Additionally, the belting would add impurities to the desired rubber byproduct if the rasp were allowed to cut into the belting.

FIG. 4 shows some cutting of the rasp 58 into the rubber portion 54 of the tire. Advancement of the yoke 66 by the hydraulic ram 70 is ceased prior to contact of the rasp 58 with the belting 56 of the tire. Referring now to FIG. 5, rotation of the driven tensioning rollers 62 and 64 progresses the entirety of the tire 24 past the rasp 58. As the material 54 is cut from the tire the thickness of the tire changes, being reduced to a thickness only slightly greater than that of the belting 56. The biasing of the rollers accommodates this variation in thickness to maintain drive tension and tire stress against the rasp. A portion of a tire which has been stripped of material is reduced in thickness, but the helical spring 96 of the lever arms 90 and 92 pivots the tensioning roller 64 associated with this thinner portion of the tire, as shown in FIG. 5. In like manner, the traction enhancement rollers 74 and 76 may move independently to maintain proper force of the tire against the tensioning rollers.

The symmetry of the tire stressing assembly 52 permits operation of the apparatus in either a clockwise or a counterclockwise direction. The tire may be intact, i.e. endless, or may be cut and thus be double-ended. The tire 24 may be progressed past the rasp 58 either leftwardly or rightwardly, as viewed in the figure. Because of the properties of the rubber material 54, typically the blades of a tire buffing apparatus are worn in a relatively short time period. The symmetry of the rollers, however, permit continued use of the blades after the blade edges associated with one direction have become dull.

The structure of the rasp 58 is illustrated in FIGS. 6 and 7. The circumference of the rasp 58 is made of alternating blade segments 100 and spacers 102. In constructing the rasp the blade segments 100 and spacers 102 are placed side-by-side between end plates 104 at an angle C relative to the vertical. Bores are then drilled through the assembly and externally threaded fastening members are passed through the bores. Nut-and-washer arrangements 106 at both ends of the fastening members are used to secure the assembly. Each blade segment 100 includes a plurality of apertures 108 to receive fastening members. These blades have a mechanical strength exceeding that of the material of a tire and have an upper portion which is a sequence of edges 110 and plateaus 112. This upper, cutting portion of a blade segment 110 reaches above the height of a spacer, shown by dashed line 114 in FIG. 7.

Because the blade segments 100 and spacers 102 are slanted at angle C, the rasp 58 will have a tendency to walk a tire off the rasp. The slant of the cutters is important in preventing formation of grooves during buffing of a tire, as would occur if the cutting was perpendicular to the tire. However, the walking of a tire off the rasp is undesirable. For this reason, guides 116 and 118 are positioned adjacent the rasp 58. The guides 116 and 118 are sufficiently close to the rasp to prevent passage of the tire therebetween. Phantoms 116', 116" and 118' illustrate adjustment of the guides to accommodate tires of different widths.

The rasp 58 is supported on a shaft 120 which is rotatably driven by the drive motor 38. The drive motor is a 30-100HP motor. Referring now to FIGS. 6 and 8, the first and second tensioning rollers 62 and 64, shown in phantom in FIG. 6, are driven by a hydraulic motor 122. The hydraulic motor 122 drives a shaft 124 to which forward and rearward sprockets 126 and 128 are keyed. Drive chains 130 and 132 are each trained about one of the sprockets and extends over a roller gear 134 and 136. Keys 138 link the roller gears 134 and 136 to shafts 140 and 142. The tensioning rollers 62 and 64 are fixed on the shafts 140 and 142, causing rotational motion by the hydraulic motor 122 to be translated into rotational motion by the tensioning rollers.

FIG. 9 illustrates the gauging assembly utilized to ensure that movement of the yoke 66 by the hydraulic ram 70 does not cause the belting of a captive tire to contact the rasp. The gauging assembly is located at the uppermost portion of the recycling apparatus and includes a pair of wedges 144 and 146 which are linked by a rod 148. The wedges each have a lower bearing surface which contacts the frame 150 of the apparatus. Displacement of the wedges 144 and 146 relative to the frame is caused by rotation at the knob end 152 of an adjustment bolt 154. The upper surface of each wedge 144 and 146 is inclined in a round or square bridge 156 that supports a depending bracket 158 as rested upon the inclined surface of each wedge. Therefore, clockwise rotation of the adjustment bolt 154 causes the depending brackets 158 to descend, while counterclockwise rotation raises the depending brackets. A bolt 160 secured to the yoke 66 is slidably received in an aperture within a flange 162 of each depending bracket. The flange apertures will not permit passage of a bolt head 164 and, consequently, the position of the bracket flanges 162 relative to the frame 150 determines the lowermost extent of the yoke 66. This bracket flange position may be adjusted by displacement of the wedges 144 and 146 utilizing the adjustment bolt 154.

In operation, the side walls of a tire are removed, leaving the crown portion of the tire. This crown portion is then wrapped around the hinged upper portion 14 of the recycling apparatus 10, as shown in FIG. 2. The hinged upper portion is lowered and secured into position by the hook lock 26. The shaft 72 is then extended from the hydraulic ram 70 to the load position shown in FIG. 3. In moving the capture roller 60 to this load position, the capture roller and the two traction-enhancement rollers 74 and 76 move parallelly. Further extension of the shaft 72 continues to move the capture roller toward the radius of the rasp 58. The traction-enhancement rollers 74 and 76, however, come into contact with those portions of the tire 24 which are pinched against the tensioning rollers 62 and 64 and this contact overcomes the bias of the springs 86. In this manner, the engagement position shown in FIG. 4 is achieved.

Radially inward motion of the capture roller 60 causes deformation of the tire 24 about the circumference of the capture roller. The tire is likewise wrapped around a portion of the tensioning rollers 62 and 64. As previously noted, this provides a highly stressed condition of tire advancement toward the rasp 58. The traction-enhancement roller 74 and 76 cause further deformation of the tire 24. These rollers should not have a smooth surface, but rather should be of the type to maximize friction against the belting 56 of the tire. For example, the surface of the traction-enhancement rollers may be machined to have diamond-shaped configurations along the surface.

The tire stressing assembly 52 presents a work surface which is relatively flat compared to the work surface area which would be presented if the tire 24 were to be wrapped solely around the capture roller 60. During advancement of the tire 24 into the rasp 58, the rasp is rotated at approximately 900 rpm to cut away the rubber material 54 from the tire. The gauging assembly of the apparatus is adjusted to limit the capture roller from pushing the tire belting 56 into contact with the rasp.

FIG. 5 shows the tire stressing assembly 52 in an operating condition. The tensioning rollers 62 and 64 are rotatably driven in a direction counter to the direction of rasp rotation. As the material 54 is cut away from the tire 24, tire thickness variations occur. The rollers of the tire stressing assembly cooperate to accommodate the variations in thickness. The lever arm 92 associated with the tensioning roller 64 pivots in a counterclockwise direction to maintain drive tension against the capture roller 60. Likewise, the traction-enhancement roller 76 is biased by spring 86 so as to continue cooperation with the tensioning roller 64. Again, the symmetry and the cooperation of rollers permit the cutting of material 54 from a tire in either a clockwise or counterclockwise direction.

The finely cut rubber is discharged from the rasp as airborne particles The intake of air, as shown by arrows A in FIG. 1, is a high velocity intake drawn from below the rasp. This intake of air is important to the cooling of the rasp, since warmer cutting blades are more susceptible both to material wear and to becoming entangled within the rubber material.

The airborne material particles travel through the duct 42 to the centrifugal cyclone separator 44. The cyclone separator separates rubber particles from air. The rubber particles are then collected for recycling.

While the tire stressing assembly of the present invention has been described in conjunction with a rasp which cuts into the material of a tire, it is to be understood that the tire stressing assembly may be used to present a relatively flat work surface to the circumference of a drum which grinds material. The term "rasp" is defined as including both cutting drums and grinding drums. While reference has been made to rubber recovery from the tread portion of a tire, it will be understood that some tires have no tread or have worn-out tread. In that case, the "tread portion" is the crown portion of the tire where tread is usually located.

I claim:

1. An apparatus for removing rubber from a tire segment of the type having a threaded portion fixed to a belted underlayer, comprising,
   a rasp having an axis of rotation,
   means for rotating said rasp about said axis,
   a capture roller having a tire engagement position wherein said capture roller is adjacent to said rasp to maintain a thread portion of a captive tire in frictional contact with the circumference of the rasp,
   first and second tensioning rollers mounted on parallel shafts at opposed sides of said capture roller when said capture roller is in said engagement position, said tensioning rollers each having an operating condition in which the tensioning roller is spaced apart from said capture roller by frictional contact with a captive tire placed therebetween, and
   drive means for providing relative movement between said rotational axis of the rasp and said captive tire as the treaded portion of said captive tire is removed from a belted underlayer.

2. The apparatus of claim 1 further comprising biasing means for urging said tensioning rollers in the direction of said capture roller, said tensioning rollers being pivotally mounted in a mutually independent manner.

3. The apparatus of claim 2 wherein said first and second tensioning rollers are respectively mounted to ends of first and second lever arms, each having a pivot at the rotational axis of said rasp.

4. The apparatus of claim 3 wherein said biasing means is a spring member having opposed extremities attached to said first and second lever arms distal said tensioning rollers.

5. The apparatus of claim 1 further comprising first and second traction-enhancing rollers fixed to shafts, said first traction-enhancing roller biased to engage said first tensioning roller and said second traction-enhancing roller biased to engage said second tensioning roller, each of said traction-enhancing rollers and the associated tensioning roller providing support for a captive tire placed therebetween.

6. The apparatus of claim 5 wherein said traction-enhancing rollers and said capture roller are mounted to a yoke having means for linearly moving said rollers to said rasp.

7. The apparatus of claim 6 wherein said yoke includes adjustment means for selectively setting a minimum distance for which said capture roller may be spaced from said rasp.

8. The apparatus of claim 1 further comprising means for selectively moving said capture roller from said engagement position to a load position linearly outward from said engagement position relative to said rasp.

9. An apparatus for removing the rubber from the crown portion of a tire comprising,
   a rasp having an axis of rotation and having means for cutting into a tire,
   means for rotating said rasp about said axis,
   a capture roller having an engagement position closely adjacent said rasp and having a load position removed from said rasp,
   first and second tensioning rollers disposed on opposed sides of said capture roller when the capture roller is in said engagement position,
   biasing means for urging each tensioning roller in the direction of said capture roller for frictional contact with a tire placed between the tensioning roller and the capture roller, and means for providing displacement of said tire relative to said capture roller.

10. The apparatus of claim 9 further comprising a yoke and extension means for providing motion to said yoke relative to said rasp, said capture roller mounted to said yoke, said extension means selectively moving said capture roller between the load position and the engagement position.

11. The apparatus of claim 10 wherein said yoke includes first and second traction-enhancing rollers, said movement of the capture roller being a long first radius of the rasp and the corresponding movement of the yoke causing a first displacement of the traction-enhancing rollers parallel to said first radius, said first and second traction-enhancing rollers mounted to said yoke so as to respectively contact said first and second tensioning rollers.

12. The apparatus of claim 11 wherein said traction-enhancing rollers are each spring biased to cause a second displacement of said traction-enhancing rollers, said second displacement being at an angle to said first radius.

13. The apparatus of claim 9 further comprising means for adjusting the engagement position of said capture roller, thereby setting the minimum distance between said capture roller and said rasp.

14. The apparatus of claim 9 wherein said first and second tensioning rollers are respectively mounted to first ends of lever arms having pivot axes at the rotational axis of said rasp, said biasing means urging together the second ends of said lever arms.

15. The apparatus of claim 9 wherein said means for providing displacement of a tire is a drive assembly for rotating said tensioning rollers in a direction opposite the rotation of said rasp.

16. An apparatus for removing the rubber from the crown portion of a tire comprising, a rotary rasp having means for cutting into a tire, drive means for rotating said rotary rasp, first and second tensioning rollers, each closely spaced from the circumference of said rotary rasp and pivotally mounted for mutually independent motion about said rotary rasp, each tensioning roller being biased in the direction of the other, a capture roller mounted for radial movement relative to said rotary rasp, said capture roller having an engagement position closely spaced from said circumference of the rotary rasp, said engagement position being between said tensioning rollers, said capture roller further having a load position removed from said engagement position, roller drive means for providing rotational motion to at least one of said capture roller and said tensioning rollers to displace a tire in frictional contact therewith, and traction-enhancement means for providing a wrap angle of a tire about each tensioning roller that is at least 60 degrees when said tire is held between said capture rollers and tensioning roller and between said rotary rasp and said capture roller.

17. The apparatus of claim 16 wherein said tractionenhancement means includes a pair of rollers mounted for motion parallel to said capture roller and disposed to contact one of said tensioning rollers.

18. The apparatus of claim 16 wherein the ratio of the diameter of said capture roller to said rotary rasp is within the range of 1:2.5 and 1:6.

19. The apparatus of claim 16 wherein said capture roller is mounted to a hydraulic ram.

20. The apparatus of claim 16 wherein said roller drive means provides rotational motion in a direction opposite to said rotary rasp.

* * * * *

UNITED STATES PATENT AND TRADEMARK OFFICE
CERTIFICATE OF CORRECTION

PATENT NO. : 4,840,316

DATED : June 20, 1989

INVENTOR(S) : Randel L. Barclay

It is certified that error appears in the above-identified patent and that said Letters Patent is hereby corrected as shown below:

Column 6, line 27, "extends" should read - - extend - -.

Claim 16, column 10, line 24, after "capture", "rollers" should read - - roller - - and after "tensioning", "roller" should read - - rollers - -.

Signed and Sealed this

Tenth Day of July, 1990

Attest:

HARRY F. MANBECK, JR.

*Attesting Officer*  *Commissioner of Patents and Trademarks*